J. H. GULICK.
Machine for Cutting Green Corn from the Cob.

No. 218,876. Patented Aug. 26, 1879.

Witnesses:
B. F. Conrad
R. S. Blacke

Inventor:
James H. Gulick
By J. F. Zerbe
Atty.

UNITED STATES PATENT OFFICE.

JAMES H. GULICK, OF CINCINNATI, OHIO.

IMPROVEMENT IN MACHINES FOR CUTTING GREEN CORN FROM THE COB.

Specification forming part of Letters Patent No. 218,876, dated August 26, 1879; application filed May 3, 1879.

*To all whom it may concern:*

Be it known that I, JAMES H. GULICK, of Cincinnati, in the county of Hamilton and State of Ohio, have invented a new and useful Improvement in Machines for Cutting Green Corn from the Cob, which improvement is fully set forth in the following specification and accompanying drawings, in which—

Figure 1:
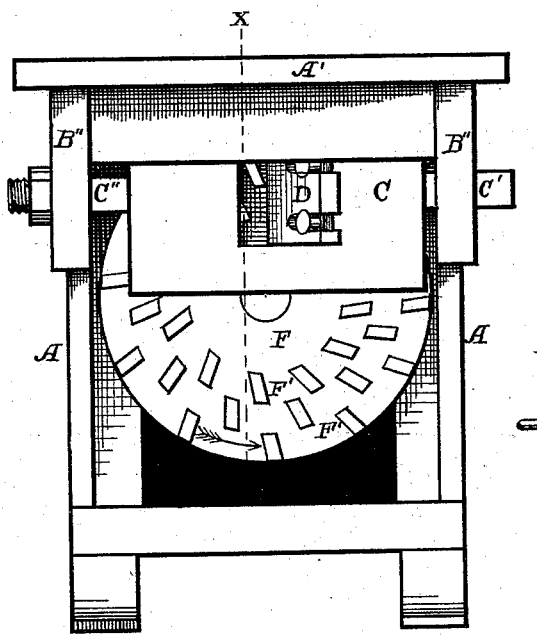
Figure 2:
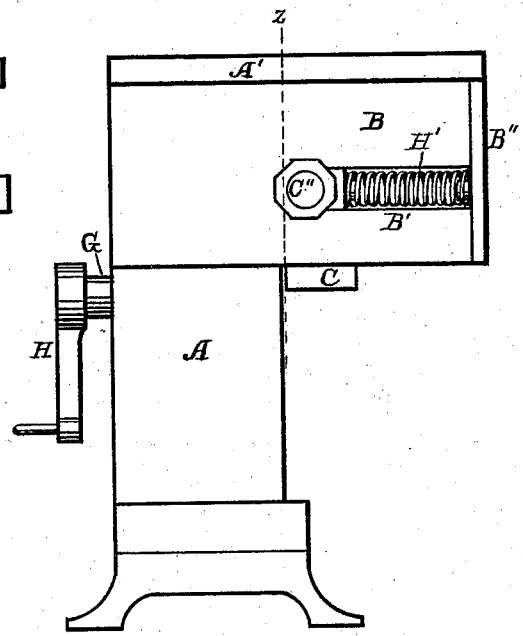
Figure 3:
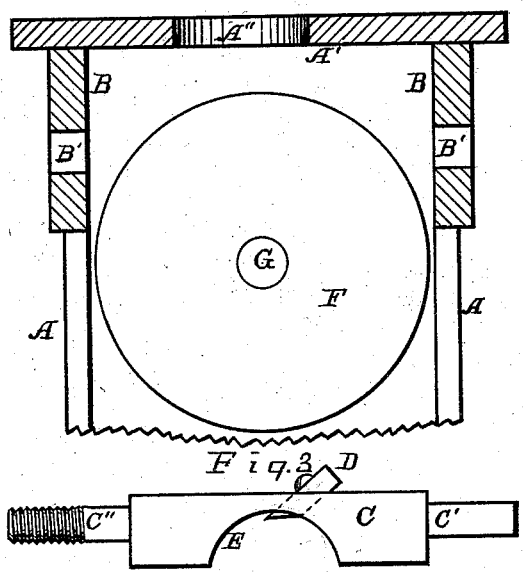
Figure 4:
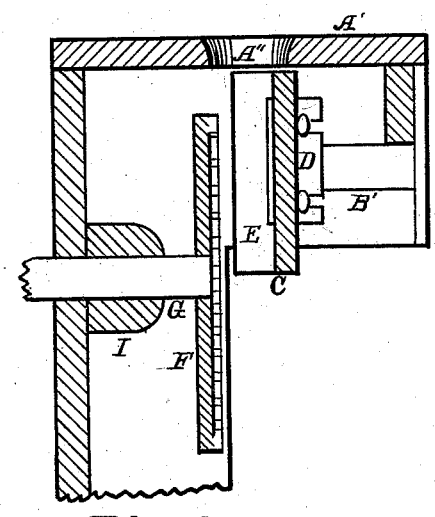

Figure 1 is a front view. Fig. 2 is a side view; Fig. 3, a sectional view of Fig. 2 through the line Z; Fig. 4, a sectional view of Fig. 1 through the line X, and Fig. 5 a detail drawing of the knife-block.

The object of my invention is to provide a machine for cutting green corn from the cob; and it consists in a frame having a wheel with a toothed face so arranged that when an ear of corn is pressed against its surface and the wheel is set in motion it causes the ear of corn to rotate and act against a stationary knife on the opposite side of the ear, which cuts off the kernels.

It also consists in a device for regulating the feed of the ear through the machine, as will hereinafter be more fully set forth.

In the drawings, A is the upright of the frame, having suitable base-pieces or feet and end pieces, B, which project forward over the base. These end pieces, B, have horizontal slots B' cut into them, which extend to the front edge of the uprights A, and are provided with caps or cleats B''.

Figure 5:

Fig. 5 shows the edge view of a block, C, having near its central part a semicircular portion cut away from its flat side, and is still further provided with a beveled opening at this point, through which a knife, D, projects for cutting off the kernels.

The block C is also provided at each end with square extensions C' C'', which slide in the slots B' in the end pieces, B, and thus hold the block and knife in a vertical position.

A spring, H', is interposed between each extension C' C'' and the caps B'', to keep the block as near the wheel F as the ear of corn will permit.

On the extension C'' a thread is cut, which is provided with a nut, the object of which will be hereinafter explained.

G is a shaft, having a crank, H, at its rear end. Attached to the front end of this shaft is a wheel, having teeth on its face next to the block and knife.

The top A' is provided with a hole slightly elongated in the direction of the face of the wheel.

The operation of the machine is as follows: The ear of corn is inserted in the opening A'', and the wheel set in motion by means of the crank H. This motion in Fig. 1, being to the left, causes the ear to revolve by means of the action of the teeth F' against it. The knife D being on the opposite side of the ear from the wheel, its cutting-edge meets the revolving ear, and the kernels are cut off. At the same time the angle of the teeth F', being downward, draws the ear down as it revolves, presenting a new tier of kernels at each revolution.

Since all ears of corn are not of the same diameter, the springs H' adjust the block and knife to suit the size of the ear.

If it is desired to increase the downward speed of the ear, the nut on the projection C'' is turned to the right, which draws the block and knife to the left of the center of wheel F, and consequently causes the teeth on said wheel to pull down the ear more rapidly.

Having described my invention, what I claim as new, and desire to secure by Letters Patent, is—

1. A frame having slots B' and block C, provided with projections C' C'', the latter of which is provided with a nut for regulating the cutting capacity, substantially as shown, and for the purpose specified.

2. The combination of frame A B, slots B', top A', having elongated opening A'', crank H, shaft G, wheel F, with springs H', block C, having cut-away portion E, and extensions C' C'', substantially as and for the purpose specified.

In testimony that I claim the foregoing I have hereunto set my hand this 25th day of April, A. D. 1879.

JAMES H. GULICK.

Witnesses:
  J. S. ZERBE,
  HENRY J. HARROP.